(12) United States Patent
Kruempelmann et al.

(10) Patent No.: US 11,372,829 B2
(45) Date of Patent: Jun. 28, 2022

(54) DATABASE VIEW BASED MANAGEMENT OF CONFIGURATION DATA FOR ENTERPRISE SOFTWARE APPLICATIONS

(71) Applicant: SAP SE, Walldorf (DE)

(72) Inventors: Wulf Kruempelmann, Altlussheim (DE); Barbara Freund, Heidelberg (DE)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 16/690,081

(22) Filed: Nov. 20, 2019

(65) Prior Publication Data

US 2021/0149856 A1 May 20, 2021

(51) Int. Cl.
| | |
|---|---|
| *G06F 16/00* | (2019.01) |
| *G06F 16/21* | (2019.01) |
| *G06F 8/71* | (2018.01) |
| *G06F 8/77* | (2018.01) |
| *G06F 16/25* | (2019.01) |
| *G06F 16/215* | (2019.01) |

(52) U.S. Cl.
CPC .............. *G06F 16/219* (2019.01); *G06F 8/71* (2013.01); *G06F 8/77* (2013.01); *G06F 16/215* (2019.01); *G06F 16/254* (2019.01)

(58) Field of Classification Search
None
See application file for complete search history.

(56) References Cited

U.S. PATENT DOCUMENTS

2006/0015850 A1* 1/2006 Poole .................. G06F 8/71
717/120

\* cited by examiner

*Primary Examiner* — Bai D Vu
(74) *Attorney, Agent, or Firm* — Mintz Levin Cohn Ferris Glovsky and Popeo, P.C.

(57) ABSTRACT

A method may include storing, in a first database table, a first set of configuration data and a second set of configuration data for a software application. A first condition for activating the first set of configuration data and a second condition for activating the second set of configuration data may be stored in a second database table. A database view may be generated to include the first set of configuration data from the first database table and the first condition from the second database table. The first set of configurations may be activated in response to determining, based on the database view, that the first condition for activating the first set of configurations is present. The second set of configuration data may be deactivated in response to the activating of the first set of configuration data. Related systems and articles of manufacture, including computer program products, are also provided.

18 Claims, 6 Drawing Sheets

DATABASE VIEW BASED MANAGEMENT OF CONFIGURATION DATA FOR ENTERPRISE SOFTWARE APPLICATIONS

TECHNICAL FIELD

The present disclosure generally relates to cloud-computing and, more specifically, to managing configuration data for enterprise software applications.

BACKGROUND

The operations of many organizations may rely on a suite enterprise software applications including, for example, enterprise resource planning (ERP) software, customer relationship management (CRM) software, and/or the like. These enterprise software applications may provide a variety of functionalities including, for example, billing, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

Methods, systems, and articles of manufacture, including computer program products, are provided for managing configuration data for enterprise software applications. In one aspect, there is provided a system including at least one processor and at least one memory. The at least one memory can store instructions that cause operations when executed by the at least one processor. The operations may include: storing, in a first database table, a first set of configuration data for a software application and a second set of configuration data for the software application, the first set of configuration data being associated with a first globally unique identifier and the second set of configuration data being associated with a second globally unique identifier; storing, in a second database table, a first condition for activating the first set of configuration data and a second condition for activating the second set of configuration data, the first condition associated with the first globally unique identifier, and the second condition associated with the second globally unique identifier; generating, based at least on the first globally unique identifier, a database view on the first database table and the second database table, the database view including the first set of configuration data from the first database table and the first condition from the second database table; and activating the first set of configurations in response to determining, based at least on the database view, that the first condition for activating the first set of configurations is present.

In some variations, one or more of the features disclosed herein including the following features can optionally be included in any feasible combination. The second set of configuration data may be deactivated in response to the activating of the first set of configuration data.

In some variations, the first set of configuration data and the second set of configuration data may each include one or more customizations that add, remove, and/or modify at least one function of the software application.

In some variations, the activating of the first set of configurations may include generating a configuration table including the first set of configurations, and sending, to one or more production systems hosting the software application, the configuration table as part of a transport request. The configuration table may be generated to include at least a portion of the database view having the first set of configuration data from the first database table and the first condition from the second database table. The configuration table may be generated by invoking a stored procedure configured to generate the database view. The stored procedure may include a set of Structured Query Language (SQL) statements for accessing a database storing the first database table and the second database table.

In some variations, a third set of configuration data for the software application may be stored in a third database table. The third set of configuration data may be applicable to an organization as a whole. The first set of configuration data may be applicable to a first organizational structure of the organization. The second set of configuration data may be applicable to a second organizational structure of the organization. A first configuration table may be generated to include the first set of configuration data and the third set of configuration data. A second configuration table may be generated to include the second set of configuration data and the third set of configuration data. The first configuration table may be sent to a first production system associated with the first organizational structure and the second configuration table may be sent to a second production system associated with the second organizational structure.

In some variations, the first set of configuration data may be associated with a first project. The second set of configuration data may be associated with a second project. The first database table may include a field storing a first project identifier of the first project and a second project identifier of the second project. A request including the first project identifier may be received. In response to the request, a stored procedure may be invoked. The stored procedure may be configured to generate, based at least on the first project identifier a database view including the first set of configuration data from the first database table.

In another aspect, there is provided a method for managing configuration data for enterprise software applications. The method may include: storing, in a first database table, a first set of configuration data for a software application and a second set of configuration data for the software application, the first set of configuration data being associated with a first globally unique identifier and the second set of configuration data being associated with a second globally unique identifier; storing, in a second database table, a first condition for activating the first set of configuration data and a second condition for activating the second set of configuration data, the first condition associated with the first globally unique identifier, and the second condition associated with the second globally unique identifier; generating, based at least on the first globally unique identifier, a database view on the first database table and the second database table, the database view including the first set of configuration data from the first database table and the first condition from the second database table; and activating the first set of configurations in response to determining, based at least on the database view, that the first condition for activating the first set of configurations is present.

In some variations, one or more of the features disclosed herein including the following features can optionally be included in any feasible combination. The method may further include deactivating the second set of configuration data in response to the activating of the first set of configuration data.

In some variations, the first set of configuration data and the second set of configuration data may each include one or more customizations that add, remove, and/or modify at least one function of the software application.

In some variations, the activating of the first set of configurations may include generating a configuration table including the first set of configurations, and sending, to one or more production systems hosting the software application, the configuration table as part of a transport request. The configuration table may be generated to include at least a portion of the database view having the first set of configuration data from the first database table and the first condition from the second database table. The configuration table may be generated by invoking a stored procedure configured to generate the database view. The stored procedure may include a set of Structured Query Language (SQL) statements for accessing a database storing the first database table and the second database table.

In some variations, the method may include storing, in a third database table, a third set of configuration data for the software application. The third set of configuration data may be applicable to an organization as a whole. The first set of configuration data may be applicable to a first organizational structure of the organization. The second set of configuration data may be applicable to a second organizational structure of the organization. The method may further include: generating a first configuration table to include the first set of configuration data and the third set of configuration data; generating a second configuration table to include the second set of configuration data and the third set of configuration data; and sending the first configuration table to a first production system associated with the first organizational structure and the second configuration table to a second production system associated with the second organizational structure.

In some variations, the first set of configuration data may be associated with a first project. The second set of configuration data may be associated with a second project. The first database table may include a field storing a first project identifier of the first project and a second project identifier of the second project. The method may further include: receiving a request including the first project identifier; and in response to the request, invoking a stored procedure configured to generate, based at least on the first project identifier a database view including the first set of configuration data from the first database table.

In another aspect, there is provided a computer program product that includes a non-transitory computer readable medium. The non-transitory computer readable medium may store instructions that cause operations when executed by at least one data processor. The operations may include: storing, in a first database table, a first set of configuration data for a software application and a second set of configuration data for the software application, the first set of configuration data being associated with a first globally unique identifier and the second set of configuration data being associated with a second globally unique identifier; storing, in a second database table, a first condition for activating the first set of configuration data and a second condition for activating the second set of configuration data, the first condition associated with the first globally unique identifier, and the second condition associated with the second globally unique identifier; generating, based at least on the first globally unique identifier, a database view on the first database table and the second database table, the database view including the first set of configuration data from the first database table and the first condition from the second database table; and activating the first set of configurations in response to determining, based at least on the database view, that the first condition for activating the first set of configurations is present.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to managing configuration data for enterprise software applications, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
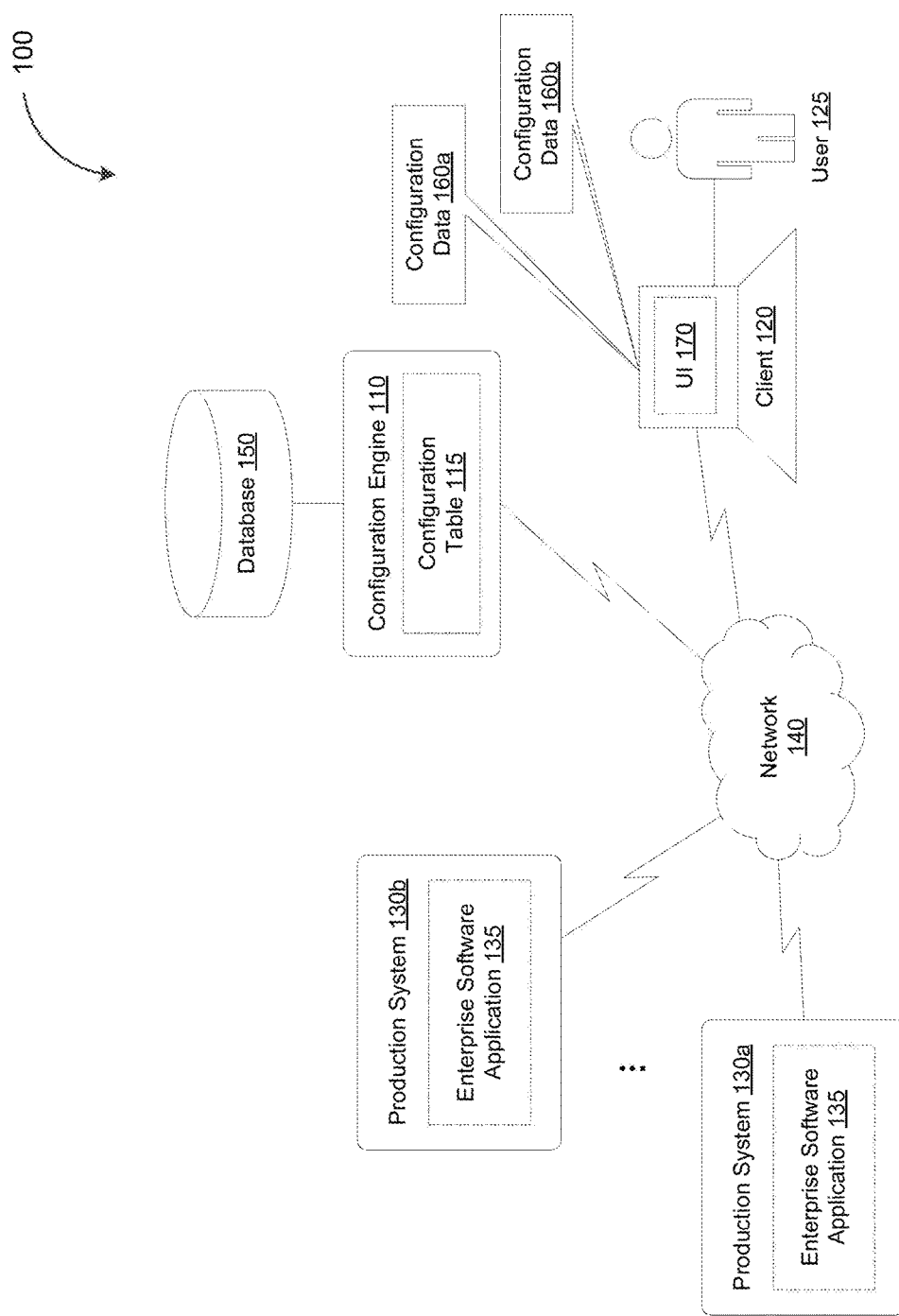
FIG. 1 depicts a system diagram illustrating a configuration system, in accordance with some example embodiments.

When practical, like labels are used to refer to same or similar items in the drawings.

DETAILED DESCRIPTION

An enterprise software application may operate on data stored in one or more database tables. As such, the enterprise software application may be implemented based on configuration data including, for example, a template defining the manner in which data is stored in the database tables. The enterprise software application may be delivered to different end users with a template library including a set of templates. Each end user may subsequently select, based on individual requirements, one or more of the templates from the template library. For instance, one end user may select, as part of the scoping the enterprise software application, a template specific to the end user's industry and/or application. That end user may further customize the enterprise software application by applying, to the selected template, one or more end user specific customizations prior to deploying the customized enterprise software application to that end user's production system. For instance, the customized enterprise software application may be deployed by at least sending, to the end user's production system, configuration data capturing the end user's customizations to the enterprise software application. The customized enterprise software application may be deployed to a cloud-computing platform such that the functionalities of the customized enterprise software application are remotely accessible from one or more thin clients (e.g., a web browser and/or the like).

A single end user may often be associated with multiple sets of configuration data. For example, the end user may be associated with a suite of enterprise software applications (e.g., an enterprise resource planning (ERP) software application, a customer relationship management (CRM) software application, and/or the like), each of which having at least one set of configuration data. For instance, a single enterprise software application may be associated a first set of configuration data that is currently active and a second set of configuration data that will replace the first version of configuration data upon the presence of a condition. Alternatively and/or additionally, the end user may be an organization associated with multiple organizational structures including, for example, divisions, subsidiaries, and/or the like. As such, the enterprise software application may be associated with a first set of configuration data for a first organizational structure of the organization and a second set of configuration data for a second organizational structure of the organization.

As noted, a single end user may be associated with multiple sets of configuration data, each of which capturing a different set of customizations to the enterprise software application. While the end user may organize different sets of configuration data into various projects, the enterprise software application may nevertheless operate based on a single configuration table that does not enable differentiation between different projects (or sets of configuration data). Moreover, the data required to populate the configuration table with a single set of configuration data may be maintained across multiple database tables. Accordingly, in some example embodiments, a configuration engine may manage the configuration data associated with the end user including by providing controlled access to multiple sets of configuration data. For example, the configuration engine may generate the configuration table including by generating, based on data from multiple database tables, a database view. The configuration engine may generate the configuration table to include the appropriate set of configuration data such as, for example, a set of configuration data that is currently active (e.g., due to the presence of a condition) and/or applicable to a particular organizational structure (e.g., division, subsidiary, and/or the like). The enterprise software application may then operate based on the set of configuration data included in the configuration table.

FIG. 1 depicts a system diagram illustrating a configuration system 100, in accordance with some example embodiments. Referring to FIG. 1, the configuration system 100 may include a configuration engine 110 and a client 120. The configuration system 100 may further include a plurality of production systems including, for example, a first production system 130a, a second production system 130b, and/or the like. As shown in FIG. 1, the configuration engine 110, the client 120, the first production system 130a, and the second production system 130b may be communicatively coupled via a network 140. The network 140 may be a wired and/or wireless network including, for example, a wide area network (WAN), local area network (LAN), a virtual local area network (VLAN), the Internet, and/or the like. Meanwhile, the first production system 130a and/or the second production system 130b may be cloud-based systems hosted on one or more cloud-computing platforms.

The user 125 at the client 120 may interact with the configuration engine 110 to in order to scope an enterprise software application 135, which may be an enterprise resource planning (ERP) software application, a customer relationship management (CRM) software application, and/or the like. For example, the user 125 at the client 120 may interact with the configuration engine 110 to implement multiple sets of configuration data for an enterprise software application 135. Each set of configuration data may include a different set of customizations for the enterprise software application 135. Moreover, each set of configuration data may add, remove, and/or modify one or more functions of the enterprise software application 135 including, for example, billing, invoicing, procurement, payroll, time and attendance management, recruiting and onboarding, learning and development, performance and compensation, and workforce planning.

Referring again to FIG. 1, the user 125 at the client 120 may interact with the configuration engine 110 to scope the enterprise software application 135 including by generating at least a first configuration data 160a and a second configuration data 160b. The first configuration data 160a and the second configuration data 160b may each include a different set of customizations to the enterprise software application 135. For example, the enterprise software application 135 may operate on data stored in one or more database tables in order to perform one or more functions of the enterprise software application 135. Accordingly, the first configuration data 160a and the second configuration data 160b may each include a different template defining the manner in which data is stored in the database tables operated upon by the enterprise software application 135.

Table 1 below depicts pseudo programming code for a template defining the manner in which data is stored in a database table. In the example shown in Table 1, the template may include extensible markup language (XML) defining the manner in which data is stored in a database table.

TABLE 1

```
<item>
    <object_name> manufacturing method </object_name>
    <object_type> table_content</object_type>
    <table_name>tab_manufacuring</table_name>
    <field> method</field>
    <content>batch</content>
    <field>product</field>
    <content>medicine</content>
</item>
```

The first configuration data 160a and the second configuration data 160b may be active at different times at the first production system 130a and/or the second production system 130b hosting the first enterprise software application 135. Activating the first configuration data 160a or the second configuration data 160b may include deploying, to the first production system 130a and/or the second production system 130b, the first configuration data 160a or the second configuration data 160b. For example, while the first configuration data 160a may be active at the first production system 130a and/or the second production system 130b, the second configuration data 160b may remain inactive. However, the second configuration data 160b may become active and replace the first configuration data 160a at the first production system 130a and/or the second production system 130b based on the presence of one or more conditions for activating the second configuration data 160b. For instance, the second configuration data 160b may be activated at a particular time and/or in response to the occurrence of a particular event. Activating the second configuration data 160b may render the first configuration data 160a inactive as the enterprise software application 135 may operate based on a single set of configuration data at a time.

In some example embodiments, the configuration engine 110 may maintain the first configuration data 160a and the second configuration data 160b in one or more database tables at a database 150 coupled with the configuration engine 110. For example, the configuration engine 110 may store, in a single database table, the first configuration data 160a and the second configuration data 160b. Moreover, the configuration engine 110 may maintain, at the database 150, an activity table including the conditions for activating each of the first configuration data 160a and the second configuration data 160b. Each configuration included in the first configuration data 160a may be associated with a first globally unique identifier (GUID) assigned to the first configuration data 160a while each configuration included in the second configuration data 160b may be associated with a second globally unique identifier assigned to the second configuration data 160b. Moreover, each of the conditions for activating each of the first configuration data 160a and the second configuration data 160b may also be associated with a corresponding globally unique identifier.

Accordingly, the configuration engine 110 may query the database 150 to determine, based at least on the globally unique identifiers, whether one or more conditions are present for activating the first configuration data 160a or the second configuration data 160b. For example, the configuration engine 110 may determine, based on a first database view including configurations from the first configuration data 160a and a first portion of the activity table including the conditions for activating the first configuration data 160a, whether the conditions for activating the first configuration data 160a are present. Alternatively and/or additionally, the configuration engine 110 may determine, based on a second database view including configurations from the second configuration data 160b and a second portion of the activity table including the conditions for activating the second configuration data 160b, whether the conditions for activating the second configuration data 160b are present. As used herein, a "database view" may be a searchable object in the database 150 that includes a result of a query on the database 150. A "database view" does not store any data but may nevertheless operate akin to a "virtual table" in that the "database view" itself may be queried.

In some example embodiments, activating the first configuration data 160a or the second configuration data 160b may include deploying, to the first production system 130a and/or the second production system 130b, the first configuration data 160a or the second configuration data 160b. For example, if the configuration engine 110 determines to activate the first configuration data 160a, the configuration engine 110 may generate a configuration table 115 to include a database view of the database table including the first configuration data 160a and a portion of the activity table including the conditions for activating the first configuration data 160a. The configuration engine 110 may further activate the first configuration data 160a by at least sending, in a transport request to each of the first production system 130a and/or the second production system 130b, the configuration table 115 such that the enterprise software application 135 may operate based on the first configuration data 160a included in the configuration table 115. Moreover, activating the first configuration data 160a may require deactivating other sets of configuration data, such as the second configuration data 160b, because the enterprise software application 135 may operate based on a single set of configuration data. The configuration engine 110 may activate or deactivate a set of configuration data by setting a flag (e.g., a Boolean value and/or the like).

Figure 2A:
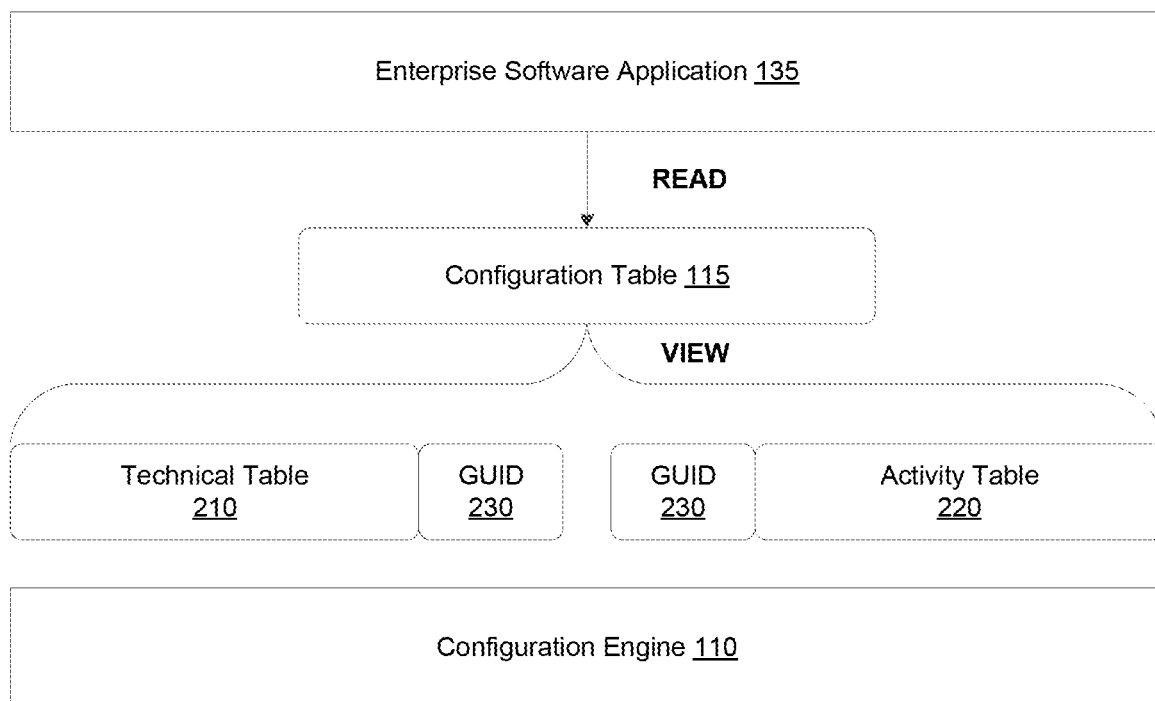
FIG. 2A depicts an example of a database view for accessing configuration data for an enterprise software application, in accordance with some example embodiments.

To further illustrate, FIG. 2A shows that the configuration engine 110 may generate the configuration table 115 to include a database view of at least a portion of a technical table 210 and at least a portion of an activity table 220. The technical table 210 may include configurations that form multiple sets of configuration data such as, for example, the first configuration data 160a. Meanwhile, the activity table 220 may include conditions for activating multiple sets of configuration data including, for example, the first configuration data 160a, the second configuration data 160b, and/or the like. For example, the technical table 210 may include legal differences (e.g., tax calculations) between different jurisdictions whereas the activity table 220 may include customizations that are specific to each jurisdiction. The configuration engine 110 may determine, based at least on a globally unique identifier 230, whether one or more conditions included in the activity table 220 for activating the first configuration data 160a included in the technical table 210 are present.

When the conditions for activating the first configuration data 160a are determined to be present, the configuration engine 110 may generate the configuration table 115 to include a database view of the portion of the technical table 210 including the first configuration data 160a and the portion of the activity table 220 including the conditions for activating the first configuration data 160a. As noted, the configuration engine 110 may activate the first configuration data 160a by at least sending, as part of a transport request to each of the first production system 130a and/or the second production system 130b, the configuration table 115 such that the enterprise software application 135 may operate based on the first configuration data 160a included in the configuration table 115. Moreover, activating the first configuration data 160a may include deactivating other sets of configuration data including the second configuration data 160b even if the second configuration data 160b is currently active at the first production system 130a and/or the second production system 130b.

Referring again to FIG. 1, in some example embodiments, the configuration engine 110 may be configured to deploy a different set of configuration data to each of the first production system 130a and the second production system 130b. For example, the first production system 130a may be associated with a first organizational structure and the second production system 130b may be associated with a second organizational structure. Accordingly, the first configuration data 160a may be deployed to the first production system 130a and the second configuration data 160b may be deployed to the second production system 130b. The first configuration data 160a and the second configuration data 160 may each include customizations that are applicable to the organization as a whole. In addition, the first configuration data 160a may include customizations that are applicable to the first organizational structure associated with the first production system 130a while the second configuration data 160b may include customizations that are applicable to the second organizational structure associated with the second production system 130b. Accordingly, the enterprise software application 135 may operate based on customizations that are applicable to the organization as a whole as well as customizations that are applicable to each individual organizational structure. For instance, the enterprise software application 135 may operate based on customizations that are consistent with the legal, administrative, and/or practical protocols that are applicable to the organization as whole and to each individual organizational structure associated with the organization.

Figure 2B:
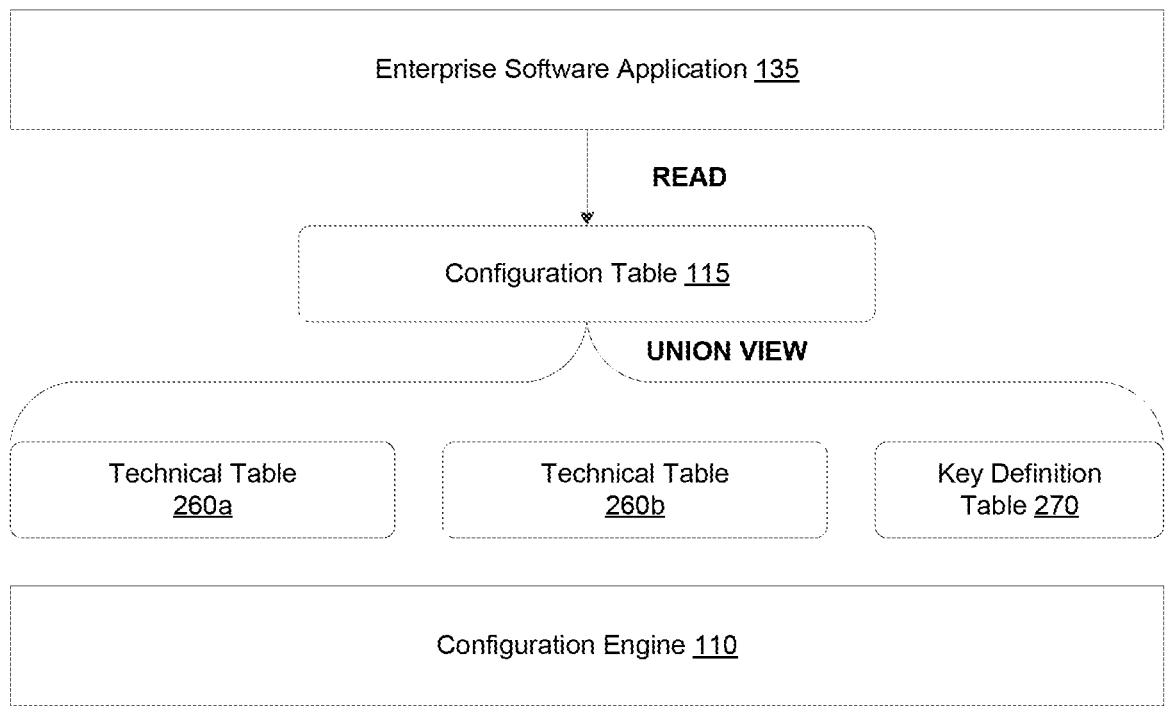
FIG. 2B depicts another example of database view for accessing configuration data for an enterprise software application, in accordance with some example embodiments.

To further illustrate, FIG. 2B shows that the configuration engine 110 may generate the configuration table 115 to include a database view of a first technical table 260a, a second technical table 260b, and a key definition table 270. The first technical table 260a may include configurations that are applicable to the organization as a whole while the second technical table 260b may include configurations that are applicable to individual organizational structures including, for example, divisions, subsidiaries, and/or the like. Each configuration included in the first technical table 260a and the second technical table 260b may be associated with a key value. Accordingly, the key definition table 270 may include definitions that identify each key value as being associated with the organization as a whole or with an individual organizational structure.

In order to generate the configuration table 115 for deploying the first configuration data 160a to the first production system 130a, the configuration engine 110 may generate a union view that includes, based at least on the definitions included in the key definition table 270, the configurations from the first technical table 260a that are applicable to the organization as a whole and the configurations from the second technical table 260b that are applicable to the organizational structure associated with the first production system 130. That is, the configuration engine 110 may identify, based at least on the definitions included in the key definition table 270, the configurations to include in the union view forming the configuration table 115. The configuration engine 110 may send, as part of a transport request to the first production system 130a, the configuration table 115 including the union view such that the enterprise software application 135 may operate based on the first configuration data 160a which, as noted, may include customizations that are applicable to the organization as a whole as well as customizations that are applicable to the first organizational structure associated with the first production system 130.

As noted, the user 125 at the client 120 may interact with the configuration engine 110 to scope the enterprise software application 135 including by generating at least the first configuration data 160a and the second configuration data 160b. The user 125 may generate the first configuration data 160a and the second configuration data 160b as separate projects but the configuration table 115 does not enable a differentiation between different projects. Accordingly, in some example embodiments, the configuration engine 110 may support access to different projects by at least invoking one or more stored procedures configured to provide access to the first configuration data 160a and the second configuration data 160b as individual projects.

As noted, the configuration engine 110 may maintain the first configuration data 160a and the second configuration data 160b in one or more database tables at the database 150 coupled with the configuration engine 110. The stored procedures invoked by the configuration engine 110 may be subroutines that include a set of Structure Query Language (SQL) statements for accessing the database 150, for example, to retrieve the first configuration data 160a or the second configuration data 160a in response to a request from the user 125 to access a corresponding project.

The configuration engine 110 may store the first configuration data 160a and the second configuration data 160b in a same database table at the database 150. Accordingly, in some example embodiments, the database table storing the first configuration data 160a and the second configuration data 160b may also include an additional field storing, for each configuration included in the database table, a project identifier indicating whether a configuration is part of the first configuration data 160a associated with a first project or part of the second configuration data 160b associated with a second project. The user 125 may request to access, for example, the first project by at least inputting, via a user interface 170, the first project identifier of the first project associated with the first configuration data 160a. According to some example embodiments, the configuration engine 110 may respond to the request to access the first project by at least invoking a stored procedure configured to generate, based on the first project identifier, a database view that includes the configurations from the database table that are part of the first configuration data 160a associated with the first project. The database view that includes the first configuration data 160a may become part of the configuration table 115 that is sent, for example, as part of a transport request, to the first production system 130a and/or the second production system 130b.

In some example embodiments, a database table "tab" may be replaced with a database table "tab#prj" having an additional field storing a project identifier. Table 2 below depicts programming code implementing a stored procedure for reading from the database table "tab." When invoked, this stored procedure may be configured to generate, based on a project identifier specified by the user 125 at the client 120, a view that includes configurations associated with the project.

TABLE 2

Procedure tab.
    Select $fields from $tab#prj where $condition and project = $project.
Endprocedure.

In some example embodiments, the user 125 at the client 120 may modify a specific project by at least inserting, updating, and/or deleting configurations from the database table "tab." Operations to change the database table "tab" may be implemented by creating a structured query language (SQL) INSTEAD OF trigger configured to bypass a SQL INSERT, DELETE, or UPDATE statement to the database table "tab."

Table 3 below depicts programming code creating a SQL INSTEAD OF trigger and implementing a SQL INSERT operation that operates on the database table "tab#prj" instead of the database table "tab." This SQL INSERT operation may insert, into the database table "tab#prj," configurations as well as the corresponding project identifiers.

TABLE 3

Create trigger tab#prj instead of table tab instead of insert.
Insert $values, $project into table tab#prj.

In some example embodiments, the configuration engine 110 may store a project name in the database table "tab#prj" as well as in a database environment variable "$project" persisted in an instance of the database 150. However, in the event the database environment variable "$project" is not accessible, for example, because the database 150 does not support such variables, the database table "tab#prj" may be defined by at least associating the project name with a session number (e.g., represented by a globally defined variable). A database view may associate the session number from database metadata with the project identifier to form the value "$project."

Figure 3A:
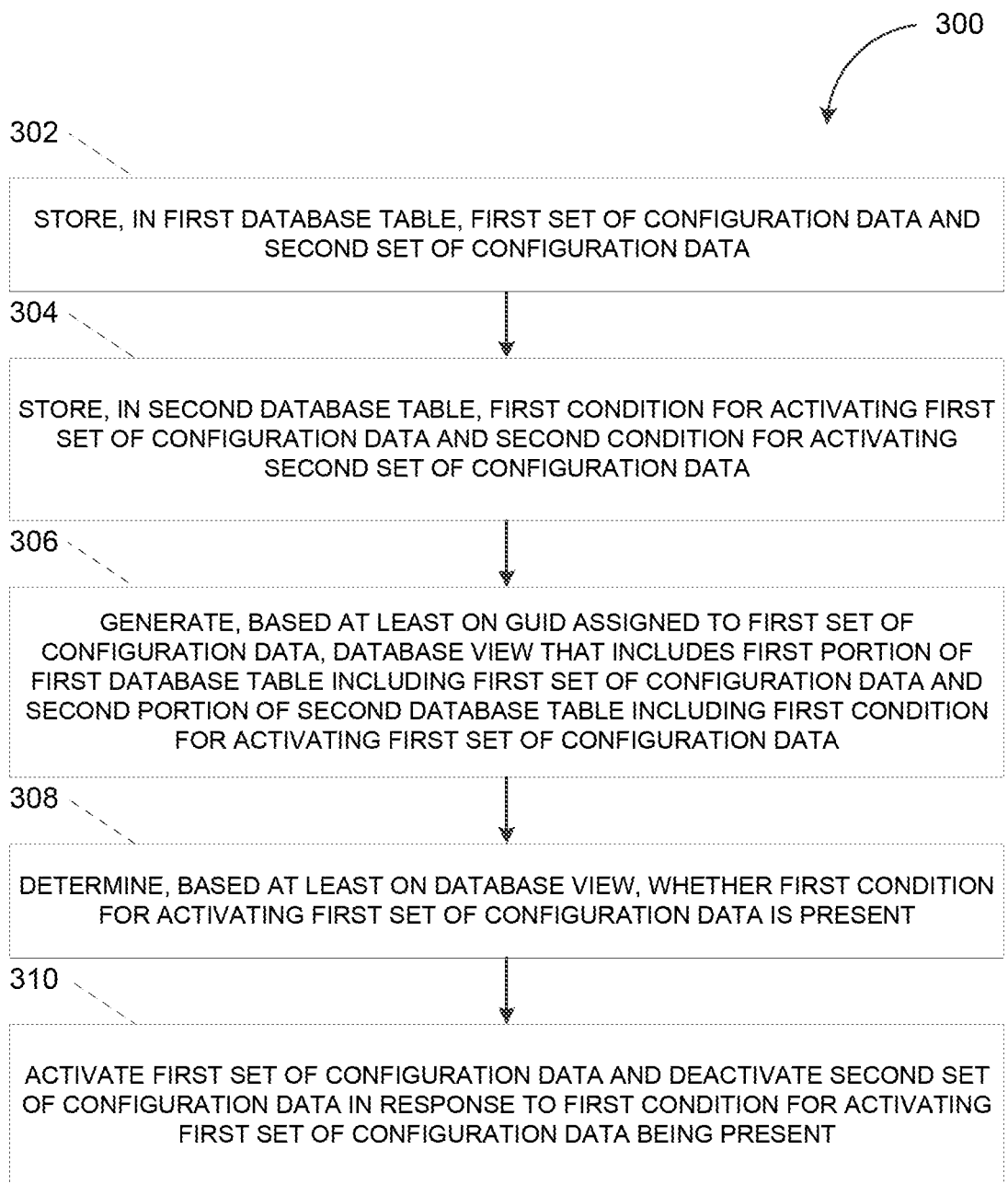
FIG. 3A depicts a flowchart illustrating an example of a process for accessing configuration data for an enterprise software application, in accordance with some example embodiments.

FIG. 3A depicts a flowchart illustrating a process 300 for deploying different sets of configuration data, in accordance with some example embodiments. Referring to FIGS. 1, 2A, and 3A, the process 300 may be performed by the configuration engine 110 in order to deploy one of multiple sets of configuration data generated by the user 125 at the client 120 including, for example, the first configuration data 160a, and the second configuration data 160b.

At 302, the configuration engine 110 may store, in a first database table, a first set of configuration data for an enterprise software application and a second set of configuration data for the enterprise software application. For example, the configuration engine 110 may store, in the technical table 210, configurations that form multiple sets of configuration data for the enterprise software application 135 including, for example, the first configuration data 160a, the second configuration data 160b, and/or the like. Each configuration in the technical table 210 may be associated with a globally unique identifier (GUID) of a corresponding set of configuration data. For example, a first configuration from the first configuration data 160a may be associated with the first globally unique identifier assigned to the first configuration data 160a while a second configuration from the second configuration data 160b may be associated with a second globally unique identifier assigned to the second configuration data 160b.

At 304, the configuration engine 110 may store, in a second database table, a first condition for activating the first set of configuration data and a second condition for activating the second set of configuration data. For example, the configuration engine 110 may store, in the activity table 220, the conditions for activating the first configuration data 160a and the conditions for activating the second configuration data 160b. Each condition for activating the first configuration data 160a may be associated with the first globally unique identifier of the first configuration data 160a while each condition for activating the second configuration data 160b may be associated with the second globally unique identifier of the second configuration data 160b.

At 306, the configuration engine 110 may generate, based at least on a globally unique identifier assigned to the first set of configuration data, a database view that includes a first portion of the first database table including the first set of configuration data and a second portion of the second database table including the first condition for activating the first set of configuration data. For example, the configuration engine 110 may generate, based at least on the globally unique identifier 230, a database view that includes a portion of the technical table 210 that includes the first configuration data 160a and a portion of the activity table 220 that includes the conditions for activating the first configuration data 160a.

At 308, the configuration engine 110 may determine, based at least on the database view, whether the first condition for activating the first set of configuration data is present. For instance, the configuration engine 110 may determine, based at least on the database view that includes the portion of the technical table 210 including the first configuration data 160a and the portion of the activity table 220 including the conditions for activating the first configuration data 160a, whether the conditions for activating the first configuration data 160a are present. These conditions may include, for example, a particular time and/or the occurrence of a particular event.

At 310, the configuration engine 110 may activate the first set of configuration data and deactivate the second set of configuration data in response to the first condition for activating the first set of configuration data being present. For example, when the conditions for activating the first configuration data 160a are determined to be present, the configuration engine 110 may activate the first configuration data 160a including by sending, as part of a transport request to the first production system 130a and/or the second production system 130b, the configuration table 115 including the database view of the portion of the technical table 210 including the first configuration data 160a and the portion of the activity table 220 including the conditions for activating the first configuration data 160a. Once activated, the enterprise software application 135 may operate based on the first configuration data 160a, which may capture one or more customizations to the enterprise software application 135 that are configured to be deployed when certain conditions are present. However, as noted, activating the first configuration data 160a may require deactivating other sets of configuration data, such as the second configuration data 160b, because the enterprise software application 135 may operate based on a single set of configuration data. The configuration engine 110 may activate or deactivate a set of configuration data by setting a flag (e.g., a Boolean value and/or the like).

Figure 3B:
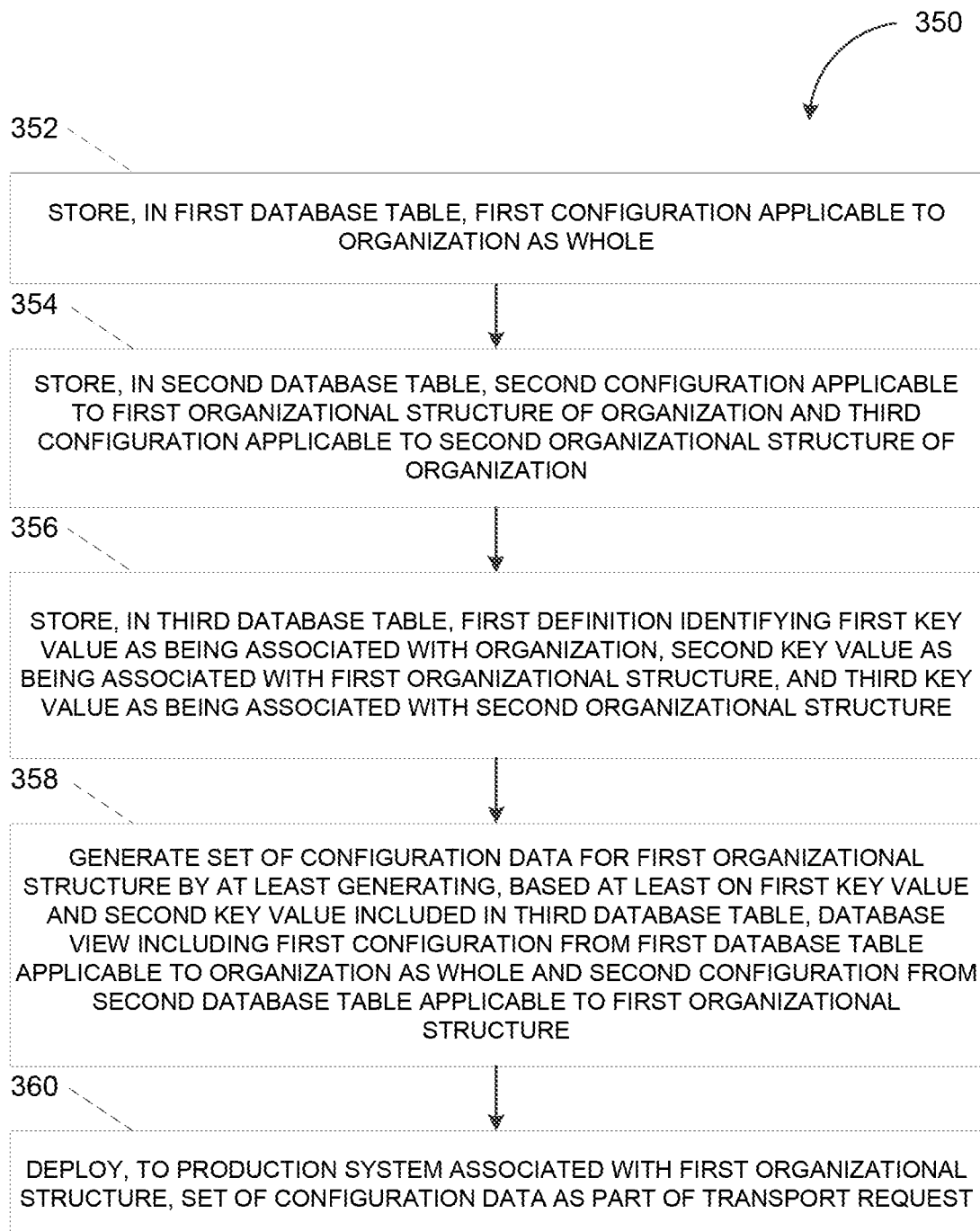
FIG. 3B depicts a flowchart illustrating another example of a process for accessing configuration data for an enterprise software application, in accordance with some example embodiments.

FIG. 3B depicts a flowchart illustrating a process 350 for deploying different sets of configuration data, in accordance with some example embodiments. Referring to FIGS. 1, 2B, and 3B, the process 350 may be performed by the configuration engine 110 in order to deploy, for example, to the first production system 130a associated with an organizational structure, a set of configuration data that includes configurations that are applicable to the organization as a whole as well as configurations that are applicable to that individual organizational structure.

At 352, the configuration engine 110 may store, in a first database table, a first configuration applicable to an organization as a whole. For example, the configuration engine 110 may store, in the first technical table 260a, configurations that are applicable to the organization as a whole.

At 354, the configuration engine 110 may store, in a second database table, a second configuration applicable to a first organizational structure of the organization and a third configuration applicable to a second organizational structure of the organization. For instance, the configuration engine 110 may store, in the second technical table 260b, configurations that are applicable to the first organizational structure associated with the first production system 130a as well as configurations that are applicable to the second organizational structure associated with the second production system 130b.

At 356, the configuration engine 110 may store, in a third database table, a first definition identifying a first key value as being associated with the organization, a second definition identifying a second key value as being associated with the first organizational structure, and a third definition identifying a third key value as being associated with the second organizational structure. In some example embodiments, each configuration included in the first technical table 260a and the second technical table 260b may be associated with a key value. Accordingly, the key definition table 270 may include definitions that identify each key value as being associated with the organization as a whole, the first organizational structure associated with the first production system 130a, or the second organizational structure associated with the second production system 130b.

At 358, the configuration engine 110 may generate a set of configuration data for the first organizational structure by at least generating, based on the first key value and the second key value included in the third database table, a database view including the first configuration from the first database table applicable to the organization as a whole and the second configuration from the second database table applicable to the first organizational structure. For example, the configuration engine 110 may generate a union view that includes, based at least on the definitions included in the key definition table 270, the configurations from the first technical table 260a that are applicable to the organization as a whole and the configurations from the second technical table 260b that are applicable to the first organizational structure associated with the first production system 130.

At 360, the configuration engine 110 may deploy, to a production system associated with the first organizational structure, the set of configuration data as part of a transport request. For instance, the configuration engine 110 may send, as part of a transport request to the first production system 130a, the configuration table 115 including the union view of the configurations from the first technical table 260a that are applicable to the organization as a whole and the configurations from the second technical table 260b that are applicable to the first organizational structure associated with the first production system 130. As such, the enterprise software application 135 may operate based on the first configuration data 160a which, as noted, may include customizations that are applicable to the organization as a whole as well as customizations that are applicable to the first organizational structure associated with the first production system 130.

Figure 4:
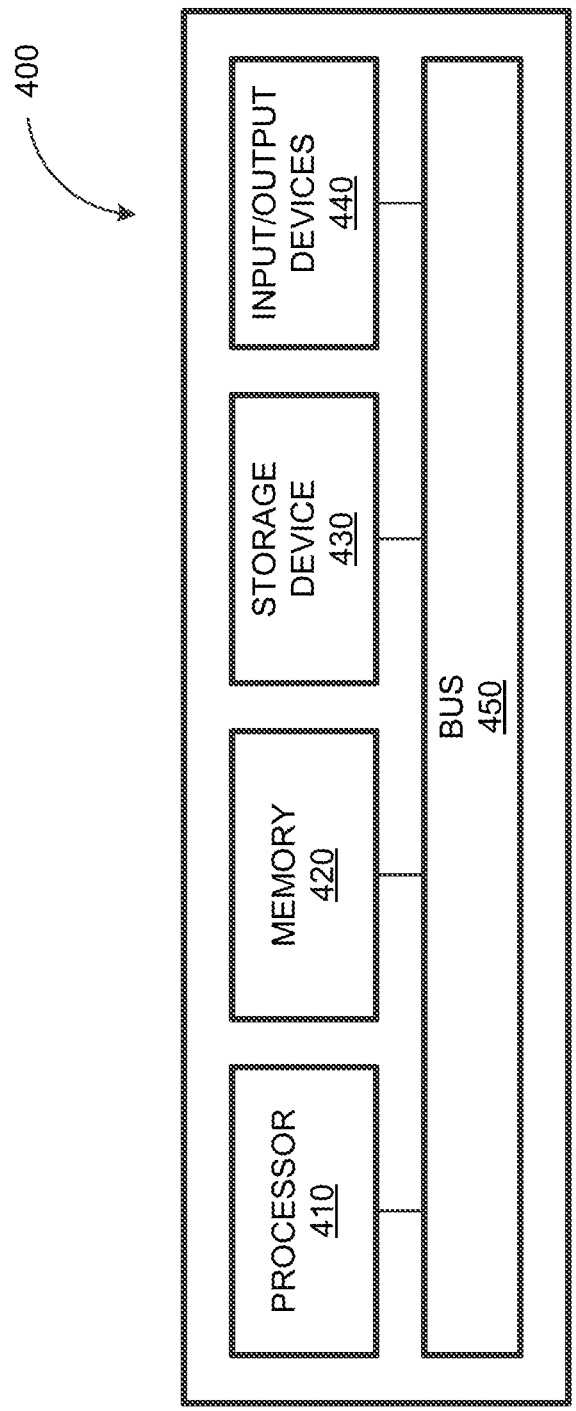
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the configuration engine 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the configuration engine 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   storing, in a first database table, a first set of configuration data for a software application and a second set of configuration data for the software application, the first set of configuration data being associated with a first globally unique identifier and the second set of configuration data being associated with a second globally unique identifier, the first set of configuration data and the second set of configuration data each including one or more customizations that add, remove, and/or modify at least one function of the software application;
   storing, in a second database table, a first condition for activating the first set of configuration data and a second condition for activating the second set of configuration data, the first condition and the second condition comprising a time and/or an occurrence of an event, the first condition associated with the first globally unique identifier, and the second condition associated with the second globally unique identifier;
   generating, based at least on the first globally unique identifier, a database view on the first database table and the second database table, the database view including the first set of configuration data from the first database table and the first condition from the second database table; and
   activating the first set of configuration data in response to determining, based at least on the database view, that the first condition for activating the first set of configuration data is present.

2. The system of claim 1, further comprising:
   deactivating the second set of configuration data in response to the activating of the first set of configuration data.

3. The system of claim 1, wherein the activating of the first set of configuration data include generating a configuration table including the first set of configuration data, and sending, to one or more production systems hosting the software application, the configuration table as part of a transport request.

4. The system of claim 3, wherein the configuration table is generated to include at least a portion of the database view having the first set of configuration data from the first database table and the first condition from the second database table.

5. The system of claim 3, wherein the configuration table is generated by invoking a stored procedure configured to generate the database view, and wherein the stored procedure comprises a set of Structured Query Language (SQL) statements for accessing a database storing the first database table and the second database table.

6. The system of claim 1, further comprising:
   storing, in a third database table, a third set of configuration data for the software application, the third set of configuration data applicable to an organization as a whole, the first set of configuration data applicable to a first organizational structure of the organization, and the second set of configuration data applicable to a second organizational structure of the organization.

7. The system of claim 6, further comprising:
   generating a first configuration table to include the first set of configuration data and the third set of configuration data;
   generating a second configuration table to include the second set of configuration data and the third set of configuration data; and
   sending the first configuration table to a first production system associated with the first organizational structure and the second configuration table to a second production system associated with the second organizational structure.

8. The system of claim 1, wherein the first set of configuration data is associated with a first project, wherein the second set of configuration data is associated with a second project, and wherein the first database table includes a field storing a first project identifier of the first project and a second project identifier of the second project.

9. The system of claim 8, further comprising:
   receiving a request including the first project identifier; and
   in response to the request, invoking a stored procedure configured to generate, based at least on the first project identifier a database view including the first set of configuration data from the first database table.

10. A computer-implemented method, comprising:
    storing, using at least one data processor and in a first database table, a first set of configuration data for a software application and a second set of configuration data for the software application, the first set of configuration data being associated with a first globally unique identifier and the second set of configuration data being associated with a second globally unique identifier, the first set of configuration data and the second set of configuration data each including one or more customizations that add, remove, and/or modify at least one function of the software application;
    storing, using the at least one data processor and in a second database table, a first condition for activating the first set of configuration data and a second condition for activating the second set of configuration data, the first condition and the second condition comprising a time and/or an occurrence of an event, the first condition associated with the first globally unique identifier, and the second condition associated with the second globally unique identifier;
    generating, using the at least one data processor based at least on the first globally unique identifier, a database view on the first database table and the second database table, the database view including the first set of configuration data from the first database table and the first condition from the second database table; and
    activating, using the at least one data processor, the first set of configuration data in response to determining, based at least on the database view, that the first condition for activating the first set of configuration data is present.

11. The method of claim 10, further comprising:
    deactivating the second set of configuration data in response to the activating of the first set of configuration data.

12. The method of claim 10, wherein the activating of the first set of configurations include generating a configuration table including the first set of configuration data, and sending, to one or more production systems hosting the software application, the configuration table as part of a transport request, and wherein the configuration table is generated to include at least a portion of the database view having the first set of configuration data from the first database table and the first condition from the second database table.

13. The method of claim 12, wherein the configuration table is generated by invoking a stored procedure configured to generate the database view, and wherein the stored procedure comprises a set of Structured Query Language (SQL) statements for accessing a database storing the first database table and the second database table.

14. The method of claim 10, further comprising:
    storing, in a third database table, a third set of configuration data for the software application, the third set of configuration data applicable to an organization as a whole, the first set of configuration data applicable to a first organizational structure of the organization, and the second set of configuration data applicable to a second organizational structure of the organization.

15. The method of claim 14, further comprising:
    generating a first configuration table to include the first set of configuration data and the third set of configuration data;
    generating a second configuration table to include the second set of configuration data and the third set of configuration data; and
    sending the first configuration table to a first production system associated with the first organizational structure and the second configuration table to a second production system associated with the second organizational structure.

16. The method of claim 10, wherein the first set of configuration data is associated with a first project, wherein the second set of configuration data is associated with a second project, and wherein the first database table includes a field storing a first project identifier of the first project and a second project identifier of the second project.

17. The method of claim 16, further comprising:
    receiving a request including the first project identifier; and
    in response to the request, invoking a stored procedure configured to generate, based at least on the first project identifier a database view including the first set of configuration data from the first database table.

18. A non-transitory computer readable medium storing instructions, which when executed by at least one data processor, result in operations comprising:
    storing, in a first database table, a first set of configuration data for a software application and a second set of configuration data for the software application, the first set of configuration data being associated with a first globally unique identifier and the second set of configuration data being associated with a second globally unique identifier, the first set of configuration data and the second set of configuration data each including one or more customizations that add, remove, and/or modify at least one function of the software application;

storing, in a second database table, a first condition for activating the first set of configuration data and a second condition for activating the second set of configuration data, the first condition and the second condition comprising a time and/or an occurrence of an event, the first condition associated with the first globally unique identifier, and the second condition associated with the second globally unique identifier;

generating, based at least on the first globally unique identifier, a database view on the first database table and the second database table, the database view including the first set of configuration data from the first database table and the first condition from the second database table; and activating the first set of configuration data in response to determining, based at least on the database view, that the first condition for activating the first set of configuration data is present.

* * * * *